ns system has a reversible drive mechanism activated by a reciprocating drive chain.

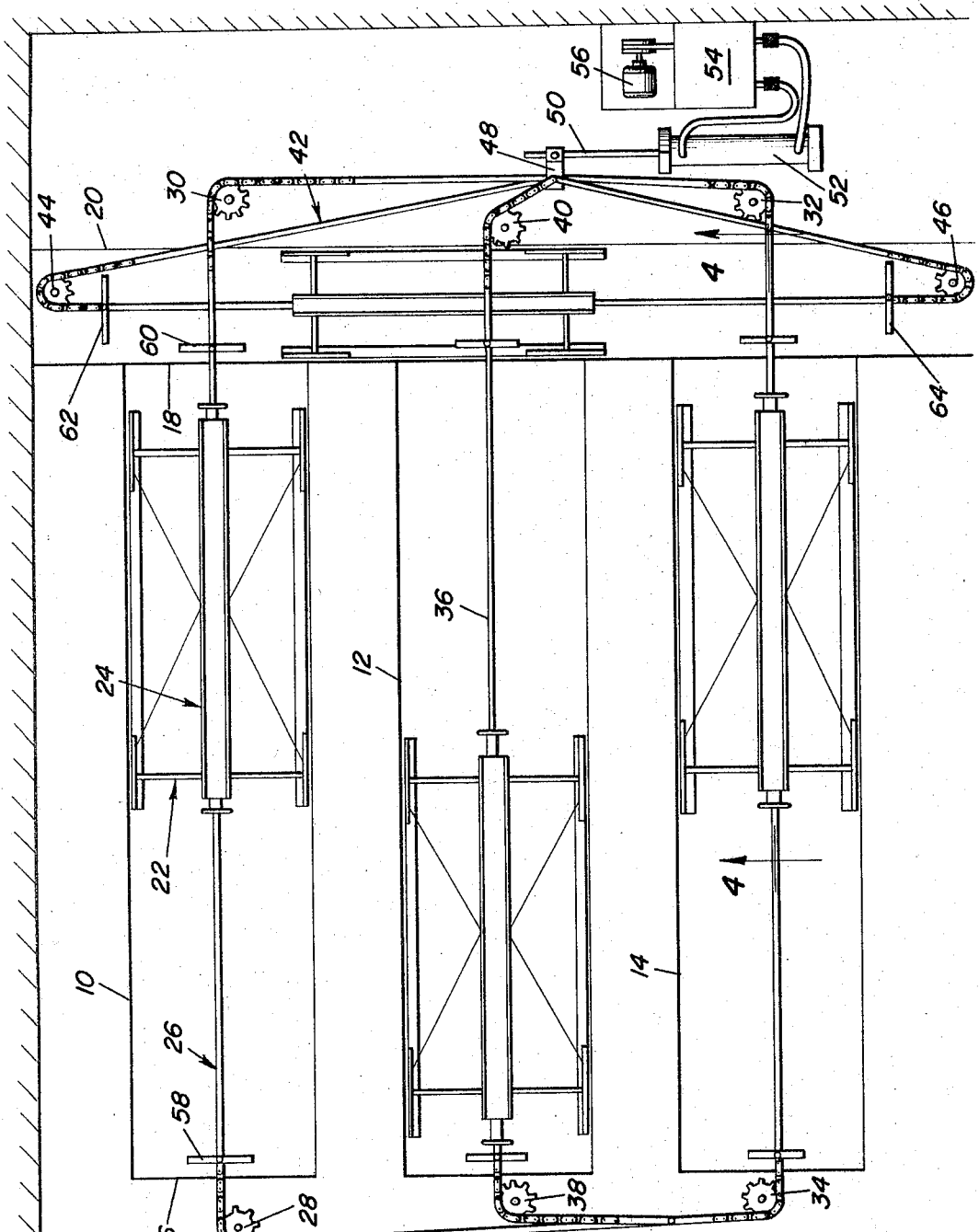

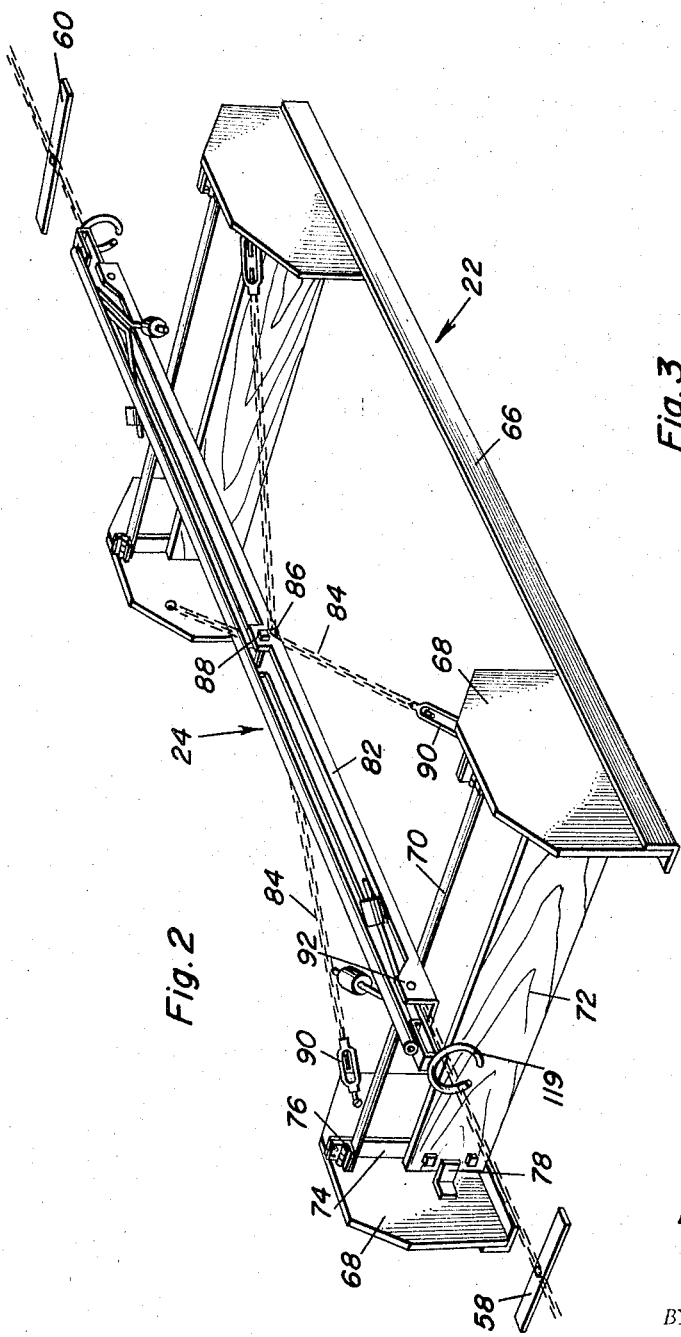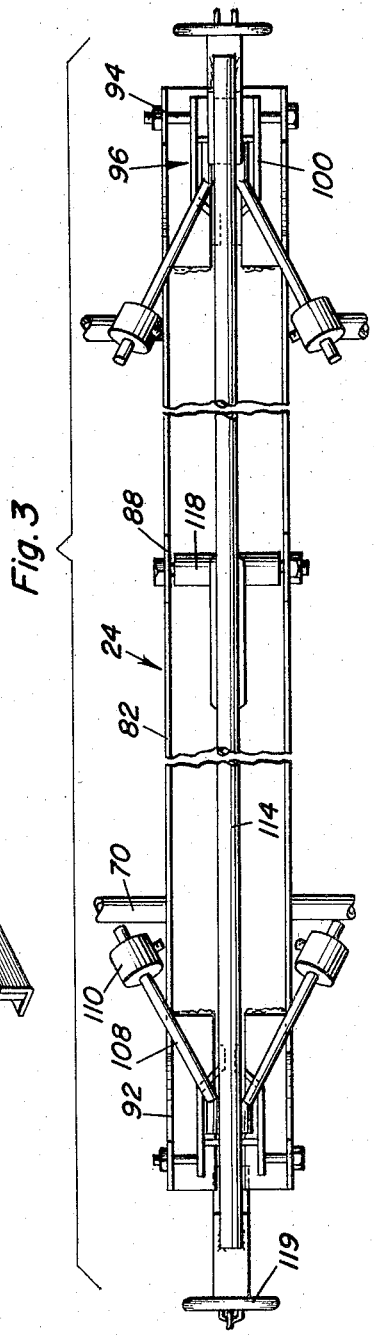

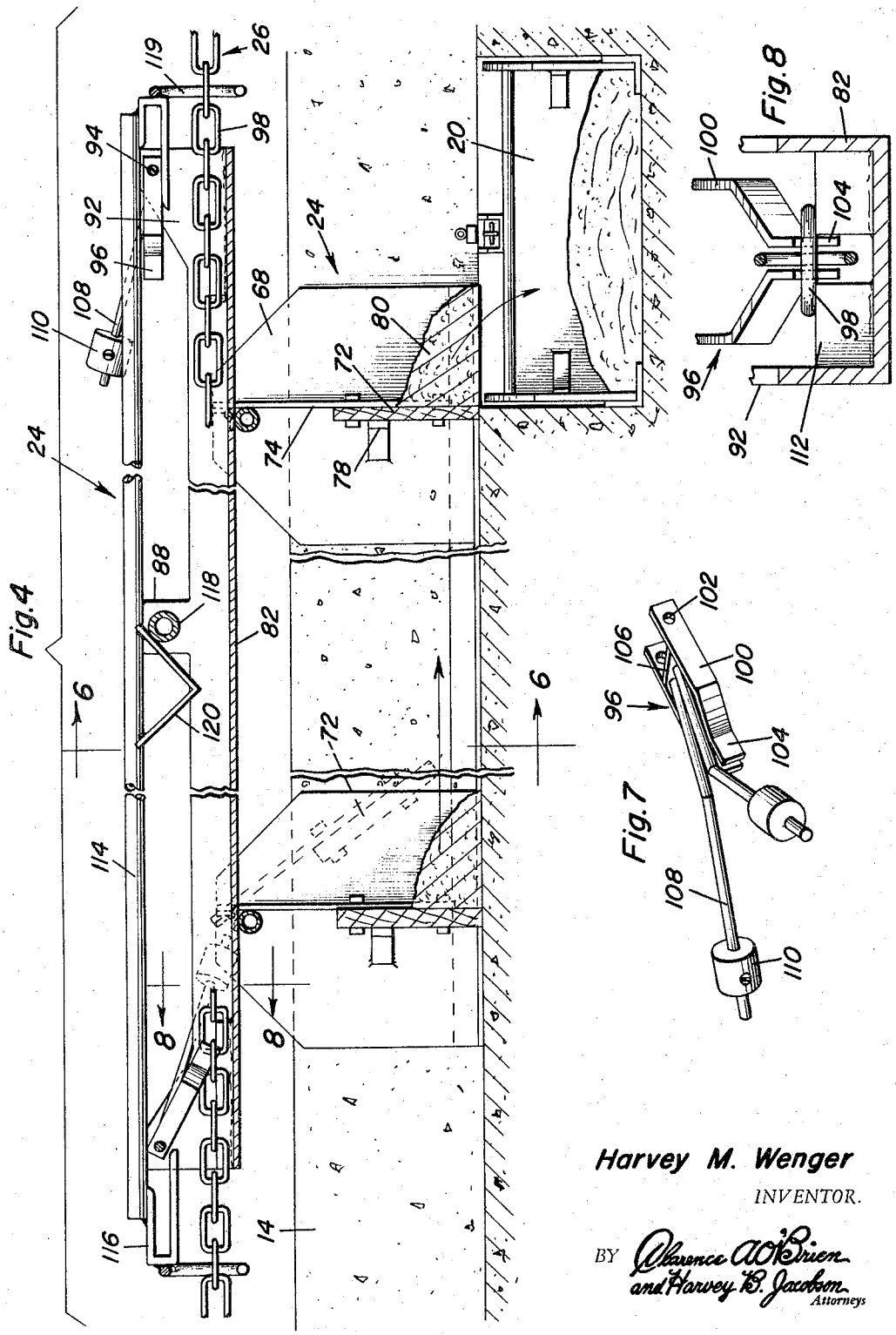

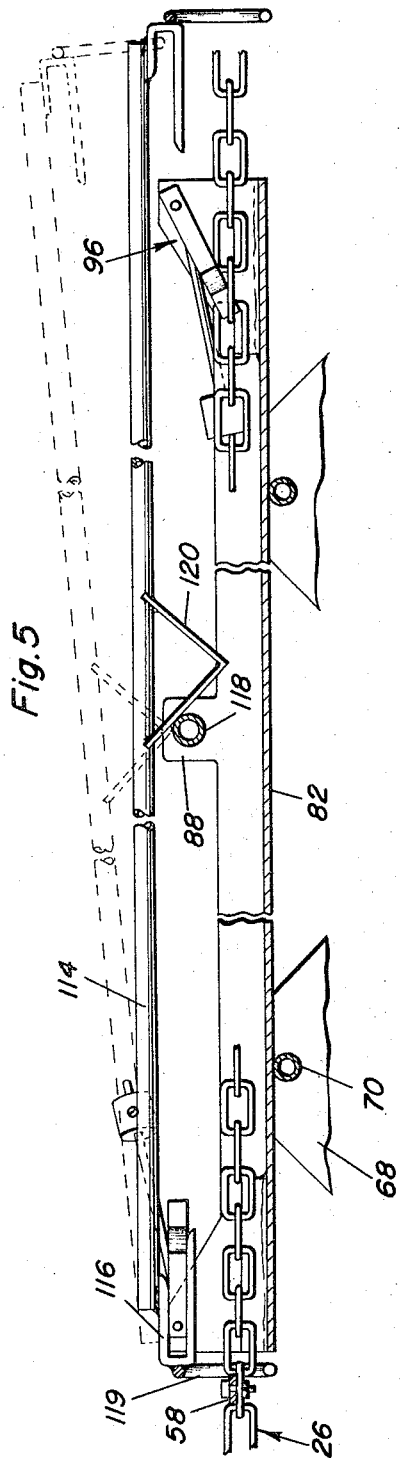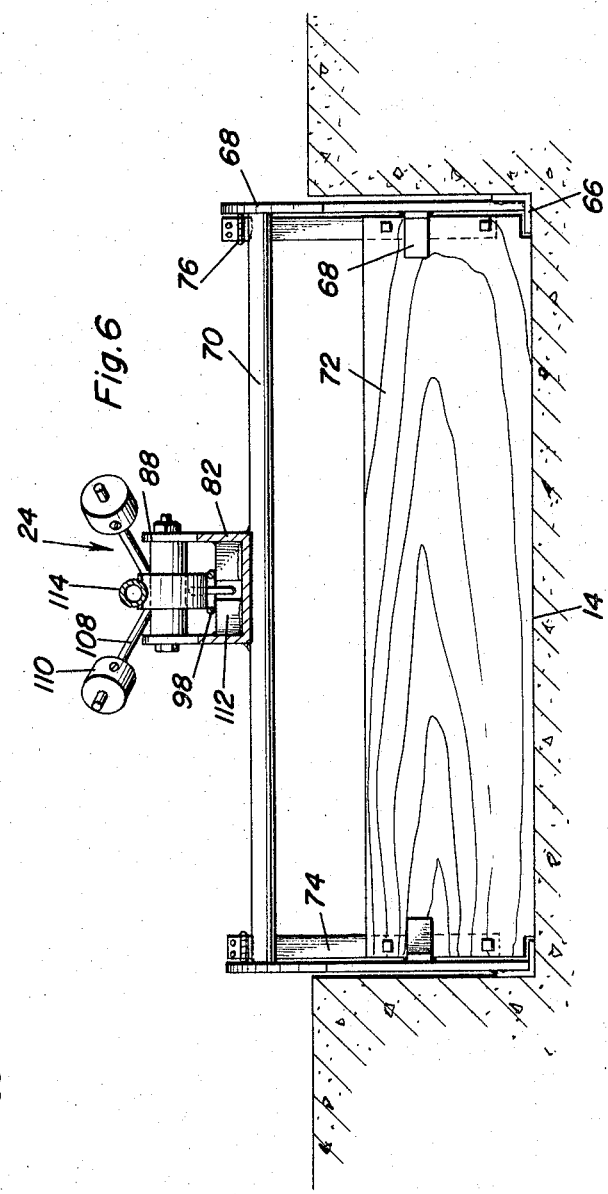

United States Patent Office 3,306,435
Patented Feb. 28, 1967

3,306,435
RECIPROCATING PIT CLEANING SYSTEM
Harvey M. Wenger, Holland, Mich., assignor to
Richard Greene, Spencer, N.Y.
Filed Aug. 19, 1965, Ser. No. 480,933
10 Claims. (Cl. 198—224)

This invention relates to apparatus for removal of material such as manure from elongated channels, troughs or pits within which such material is collected.

The present invention therefore pertains to the removal of material collected, for example, within an arrangement of pits such as utilized in connection with chicken coops. Apparatus capable of continuously removing the collected material and capable of operating for prolonged periods of time without repair or maintenance is therefore essential. The arrangement of the present invention is therefore particularly suitable for the intended installation since it is less likely to become clogged and require extensive repair as in the case of prior arrangements.

An additional object of the present invention is to provide a system in which a plurality of materials displacing assemblies are intermittently advanced through channels or pits between starting and unloading positions by a common power operated reciprocating mechanism.

A still further object of the present invention is to provide a reciprocating pit cleaning system in which material displacing assemblies are simultaneously advanced by means of a plurality of endless drive chains all being tied to a power operated reciprocating mechanism but operative to independently advance the material displacing assemblies.

Yet another object of the present invention is to provide a material displacing assembly having a reversible drive mechanism driven by a reciprocating drive chain extending therethrough. The drive chain is operative through the reversible drive mechanism to intermittently advance the material displacing assembly in one direction between limits established by stop elements mounted on the drive chain itself. Accordingly, each material displacing assembly is incrementally advanced along its drive chain from a start position to an unloading position in order to displace material collected within a channel or pit to the unloading end thereof. Upon reaching the unloading end, the drive mechanism engages the limit stop on the drive chain producing a reversal of drive so that the material displacing assembly is intermittently advanced in a return direction to its start position. During its return movement, the material displacing assembly is, of course, ineffective to displace any material through the channel or pit within which it is slidably mounted.

Other objects of the present invention are to provide a reversible drive mechanism for incrementally advancing a material displacing assembly in one direction in response to reciprocating movement imparted to a drive chain, the parts of the drive mechanism being particularly designed for the intended installation. Accordingly, the drive mechanism features chain link aligning facilities so as to ensure that the driving pawls drivingly engage the links of the drive chain otherwise prevented by twisting of the chain. Further, adjustable weight devices are associated with the drive pawls so as to obtain the requisite driving pressure that may be required in view of the clogging of the drive chain by the material to be unloaded. The drive mechanism also features a reversing pawl lifting device whereby one of a pair of driving pawls are alternatively held out of driving engagement with the drive chain so that reciprocating movement imparted to the chain will advance the material displacing assembly in one direction only, the direction of advancement being reversed when the material displacing assembly reaches the opposite limits of its movement within the material collecting channel.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of the system of the present invention;

FIGURE 2 is a perspective view of one of the material displacing assemblies associated with the system of the present invention;

FIGURE 3 is a partial top plan view of the assembly shown in FIGURE 2 depicting the drive engaging mechanism associated therewith;

FIGURE 4 is an enlarged partial sectional view taken substantially through a plane indicated by section line 4—4 in FIGURE 1;

FIGURE 5 is a partial side sectional view of the apparatus shown in FIGURE 4 but in another operative condition;

FIGURE 6 is a transverse sectional view taken substantially through a plane indicated by section line 6—6 in FIGURE 4;

FIGURE 7 is a perspective view of one of the drive engaging pawl elements associated with the drive engaging mechanism of the present invention; and FIGURE 8 is an enlarged partial sectional view taken substantially through a plane indicated by section line 8—8 in FIGURE 4.

Referring now to the drawings in detail, and initially to FIGURE 1, it will be noted that the system of the present invention is associated with a sub-floor arrangement containing a plurality of parallel spaced pits or channels 10, 12 and 14 within which material such as manure is collected. Each of the channels extends from one end 16 to an unloading end 18 intersecting a collecting channel 20 into which material from each of the channels 10, 12 and 14 is unloaded. Thus, the material collected within the channel 20 may be displaced from one end toward an unloading location.

Slidably mounted within each of the channels or pits 10, 12, 14 and 20 are material displacing assemblies 22 which are similar in construction and are dimensioned to be slidably received within the respective channels. Mounted on each material displacing assembly 22 is a drive engaging mechanism generally referred to by reference numeral 24. Thus, each material displacing assembly 22 is advanced in the opposite directions between limit positions by means of the reciprocated drive chain which extends through its associated drive engaging mechanism 24. In the arrangement illustrated in FIGURE 1, an endless drive chain 26 extends through both the drive engaging mechanisms 24 associated with the channels 10 and 14 and toward this end the endless drive chain 26 is entrained about the idler sprocket wheels 28, 30, 32 and 34. The idler sprocket wheels are mounted therefore in such a manner that portions of the drive chain will extend parallel to the channels through the drive engaging mechanisms. Another drive chain 36 may be anchored at opposite ends to the endless drive chain 26 and entrained about the idler sprocket wheels 38 and 40 so as to extend through the drive mechanism associated with the material displacing assembly within the channel 12. A drive chain 42 is also entrained about the idler sprockets 44 and 46 so that a portion thereof will extend parallel to the channel 20 through the drive engaging mechanism associated with the material displacing assembly movable within the channel 20. All of the drive chains are anchored by the connector 48 to the piston rod 50 associated with a common power operated cylinder device 52 through which reciprocatory movement is imparted simultaneously to all of the drive chains. Fluid under pressure is therefore supplied to the power operated cylinder device from a suitable pump operated fluid supply 54 driven by any suitable prime mover such as the motor 56.

It will be apparent, therefore, that continuous reciprocatory movement imparted to the drive chains will cause continuous intermittent advancement of the material displacing assemblies 22 within the channels 10, 12, 14 and 20. Each of the material displacing assemblies through its associated drive engaging mechanism is intermittently advanced in one direction between the limits of its travel so that material within the channels 10, 12 and 14 is displaced into the collecting channel 20 when the respective material displacing assemblies 22 are advanced toward the unloading ends 18 of the channels 10, 12 and 14. The material displacing assembly within the channel 20 on the other hand will be advanced in one direction to displace the material collected therein in order to finally unload the material into some receiving equipment.

So as to limit the travel of the material displacing assemblies 22 within the respective channels, the drive chains which extend in alignment with the channels 10, 12 and 14, mount limit stop elements 58 and 60 adjacent the start and unloading ends, respectively. Similarly, limit stop elements 62 and 64 are secured to the drive chain 42 associated with the channel 20. The limit stop elements are adapted to be engaged by the drive engaging mechanism 24 when the material displacing assembly 22 is advanced to the limit of its travel, causing a reversal of the drive engaging mechanism so as to reverse the direction in which the material displacing assembly is advanced by the reciprocatory movement of the drive chain with which it is associated. Therefore, as each material displacing assembly is intermittently advanced to the unloading position, it is then intermittently advanced in a return direction toward the starting end of its channel. While returning to the starting end of the channel, the material displacing assembly is ineffective to displace any material as will be hereafter explained.

Referring now to FIGURES 2 and 3, it will be observed that the material displacing assembly 22 includes a pair of runner members 66 in the form of angle iron members. A mounting plate member 68 is secured as by welding to opposite ends of the runner members 66 and extend upwardly therefrom so that the plate members 68 at each end of the runner members may be interconnected in laterally spaced relation to each other by the spacing rods 70. Accordingly, a rigid assembly is formed with the runners 66 fixedly spaced apart so as to be received with sliding clearance between the side walls of the channels within which the material displacing assembly is disposed. Pivotally mounted between the plate members 68 adjacent opposite ends of the runners 66 are material scraper blade members 72. Each blade member therefore has a pair of hinge straps 74 secured to the opposite lateral ends thereof so that the blade member may be pivotally suspended below the spacing rod 70 to which the hinge straps 74 are secured by the hinge assemblies 76. Also secured to the inside of the plate members 68 are stop elements 78 adapted to abut the blade members on one side thereof in order to prevent pivotal displacement in one direction. Accordingly, advancement of the material displacing assembly in one direction will cause the blade members 72 to displace material since the stop elements 78 will prevent pivotal displacement of the blade members by the material while advancement of the material displacing assembly in the return direction will be ineffective to displace any material since the blade members will pivot rearwardly. Referring therefore to FIGURE 4, it will be observed that the material displacing assembly 22 is effective to displace material 80 within the channel 14 toward the discharge end of the channel so as to dump the material into the channel 20. Once the material displacing assembly reaches the limit of travel, however, continued reciprocation of the drive chain 26 will advance the material displacing assembly in a return direction so that any material which may have collected within the channel 14 will merely cause the blade member 70 to pivot rearwardly as shown by dotted lines in FIGURE 4.

The drive engaging mechanism 24 as shown in FIGURE 2 includes an elongated channel guide member 82. The channel guide member 82 bridges the spacing rods 70 and extends beyond the material displacing blade members 72 pivotally suspended therebelow. The drive engaging mechanism is secured to the material displacing assembly by means of a pair of anchoring chains 84 connected by an anchoring element 86 intermediate the ends thereof to the intermediate portion 88 of the channel guide member 82. The opposite ends of the anchoring chains 84 are secured by turnbuckle devices 90 to the plate members 68 so that a resilient and disconnectible connection may be established between the associated material displacing assemblies and drive engaging mechanisms.

Referring now to FIGURES 3, 4 and 6, it will be observed that the drive chain 26 extends through the guide channel member 82, the side walls of which have upwardly extending portions 92 at opposite ends. The side wall portions 92 at each end of the channel guide member 82 therefore pivotally mounts by means of the pivot pins 94 the drive engaging pawl 96. Each pawl 96 is therefore adapted to fall downwardly into engagement with the links 98 of the drive chain therebelow which extend through the channel guide member 82. As more clearly seen in FIGURE 7, each pawl 96 includes a pair of interconnected elements 100 having aligned apertures 102 through which the pivot pin 94 extends and link engaging portions 104 more closely spaced apart so as to be received within a horizontal link of the drive chain as shown, for example in FIGURE 8. Also secured to the connecting element 106 are a pair of diverging weight mounting arms 108 which extend upwardly from the pawl elements 100. Accordingly, weights 110 may be adjustably mounted on the arms 108 for the purpose of downwardly biasing the drive engaging pawls with sufficient pressure as to effectively engage the links of the drive chain despite any accumulation of material thereon. Also, in order to ensure that the links of the chain are in proper position for engagement by the driving pawls, a pair of link aligned blocks 112 are secured along the bottom of the guide channel member 82 a sufficient distance from the ends thereof so as to underlie the pawls 96. The link aligning blocks 112 are spaced from each other as more clearly seen in FIGURE 8 a distance sufficient to permit passage of the vertical links of the drive chain yet support the horizontal links so as to receive therewithin the engaging ends 104 of the pawl elements 100. It will therefore be apparent that the link aligning blocks 112 will prevent any twist of the chain from displacing the links out of operative relation to the drive engaging pawls 96 as the chain enters or exits the guide channel member 82.

Each of the drive engaging pawls 96 at the opposite ends of the channel guide member 82 will advance the drive engaging mechanism 24 with which it is associated in opposite directions since reciprocatory movement of the drive chain in one direction will transmit force to the drive engaging mechanism through one of the pawls while the other pawl overruns. Therefore, by holding one of the drive engaging pawls 96 out of engagement with the drive chain, reciprocatory movement of the drive chain will advance the drive engaging mechanism and its associated material displacing assembly in one direction only. By alternately holding one and the other of the drive engaging pawls out of engagement with the chain, the direction in which the drive engaging mechanism may advance the material displacing assembly may be reversed. Toward this end, each drive engaging mechanism 24 has associated therewith an elongated rod member 114 having pawl lifting hooks 116 secured as by welding to opposite ends thereof. The rod member 114 is supported intermediate the ends thereof by means of a roller 118 mounted between the intermediate portions 88 of the channel guide member 82. A downwardly extending cam member 120 is secured to the rod member 14 intermediate the ends thereof for movably supporting the rod member in two operative positions.

When the cam member 120 is on one side of the roller 118 as shown in FIGURE 4, the lefthand pawl lifting hook 116 will be withdrawn from the lefthand pawl so that it may drop into engagement with the drive chain 26. The righthand pawl lifting hook on the other hand, will engage the righthand pawl so as to hold it out of engagement with the drive chain as shown in FIGURE 4. Therefore, as the drive chain 26 is reciprocated in opposite directions, it will transmit force in a leftward direction only to the lefthand pawl so as to cause advancement of the drive engaging mechanism and material displacing assembly in a lefthand direction as viewed in FIGURE 4. This will, of course, occur after the drive engaging mechanism has engaged the limit stop 60 associated with the unloading end of the channel 14 in order to reverse advancement of the material displacing mechanism for its return movement to the start position. The rod member 114 is therefore shifted between its two operative positions as respectively shown in FIGURES 4 and 5 when the stop engaging rings 118 engage the limit stop elements secured to the drive chains. The rings 118 are therefore secured to the pawl engaging hooks 116 as by welding and extend downwardly therefrom so that the drive chain may pass therethrough. The laterally extending stop bars which constitute the limit stop elements 58 and 60 aforementioned in connection with channel 14, for example, will thereby engage the pawl lifting facilities in order to reverse the direction in which the drive chain is effective to advance the material displacing assembly.

From the foregoing description the construction, operation and installation of the pit cleaning system of the present invention will be apparent. Although the system has been described in connection with one typical arrangement of pits or channels from which material is to be removed, it should be appreciated that the system may be readily adapted for other arrangements. Of significance, however, is the fact that material displacing assemblies may be independently operated within a plurality of channels by simultaneously imparting reciprocatory movement to drive chains by a common power operated reciprocating mechanism. Further, advancement of each of the material displacing assemblies is effected by limited reciprocatory movement of the drive chains along which the drive engaging mechanism advance the material displacing assemblies. Thus, repair or replacement of the system within any one or more of the channels may be effected without requiring a complete shutdown of the system. Further, in view of the limited reciprocatory movement imparted to the drive chains in accordance with the arrangement of the present invention, reversal of the drive engaging mechanisms may be effected in a simple and efficient manner.

The foregoing is considered as illustrative only of the principles of the invention. Further, since numerous modifications and changes will readily occur to those skilled in the art, it is not desired to limit the invention to the exact construction and operation shown and described and accordingly all suitable modifications and equivalents may be resorted to, falling within the scope of the invention as claimed.

What is claimed as new is as follows:

1. A system for removing material collected within a plurality of elongated channels having material unloading ends comprising a plurality of scraper assemblies respectively mounted for movement within each of the channels, reversible engaging means operatively connected to each of the scraper assemblies for displacement thereof in opposite directions, flexible drive means extending through all of said engaging means for driving engagement therewith in one direction of movement through the respective channels, power operated reciprocating means connected to said flexible drive means for imparting limited movement thereto in both directions within all of the channels to intermittently advance the scraper assemblies in one direction through the respective channels, and limit means mounted on the flexible drive means for reversing the direction in which the reversible drive means advances the scraper assemblies when reaching the material unloading ends of the channels, said flexible drive means comprising a plurality of endless chains, and sprocket wheel means operatively mounted in engagement with said chains for guiding movement of portions thereof parallel to the channels, each of said scraper assemblies comprising a pair of runners slidably mounted in each of the channels, spacing means interconnecting the pair of runners in fixed spaced relation to each other, blade means pivotally mounted by the spacing means between the runners for engagement with material within the channel, and stop means fixedly mounted on the runners for preventing pivotal movement of the blade means in one direction for displacing said material only toward the unloading end of the channel in response to advancement of the scraper assembly through the channel, each of said reversible engaging means comprising elongated guide means through which said flexible drive means extends, a pair of pawl elements pivotally mounted by the guide means for driving engagement with the flexible drive means in opposite directions of movement, and pawl lifting means movably carried by the guide means for displacement between opposite positions alternatively holding one of the pair of pawl elements out of engagement with the flexible drive means.

2. The combination of claim 1 wherein said limit means comprises a plurality of stop elements mounted on the flexible drive means and reversing rings connected to opposite ends of the pawl lifting means for engaging the stop elements to displace the lifting means between the opposite positions thereof.

3. The combination of claim 2 wherein said guide means comprises an elongated channel member having upwardly extending side portions at opposite ends thereof for pivotally mounting the pawl elements above the chain, chain link aligning means mounted at opposite ends of the channel member below the pawl elements to operatively guide the chain for driving engagement by the pawl elements and roller means mounted by the channel member intermediate the opposite ends thereof for supporting the pawl lifting means in one of the opposite positions thereof.

4. The combination of claim 3 wherein said pawl lifting means comprises an elongated rod, pawl engaging hooks secured to opposite ends of the rod, and a cam member secured to the rod intermediate the hooks for supporting engagement with the roller means on the channel member of the guide means.

5. A system for removing material collected within a plurality of elongated channels having material unloading ends comprising a plurality of scraper assemblies respectively mounted for movement within each of the channels, reversible engaging means operatively connected to each of the scraper assemblies for displacement thereof in opposite directions, flexible drive means extending through all of said engaging means for driving engagement therewith in one direction of movement through the respective channels, power operated reciprocating means connected to said flexible drive means for imparting limited movement thereto in both directions within all of the channels to intermittently advance the scraper assemblies in one direction through the respective channels, and limit means mounted on the flexible drive means for reversing the direction in which the reversible drive means advances the scraper assemblies when reaching the material unloading ends of the channels, each of said reversible engaging means comprising elongated guide means through which said flexible drive means extends, a pair of pawl elements pivotally mounted by the guide means for driving engagement with the flexible drive means in opposite directions of movement, and pawl lifting means movably carried by the guide means for displacement between opposite positions alternatively holding one of the pair of pawl elements out of engagement with the flexible drive means.

6. The combination of claim 5 wherein said pawl lifting means comprises an elongated rod, pawl engaging hooks secured to opposite ends of the rod, and a cam member secured to the rod intermediate the hooks for supporting engagement with the roller means in the channel member of the guide means.

7. A system for removing material collected within a plurality of elongated channels having material unloading ends comprising a plurality of scraper assemblies respectively mounted for movement within each of the channels, reversible engaging means operatively connected to each of the scraper assemblies for displacement thereof in opposite directions, an endless chain extending through each of said engaging means for driving engagement therewith in one direction of movement through the respective channels, power operated reciprocating means connected to the endless chains for imparting limited movement thereto in both directions within all of the channels to intermittently advance the scraper assemblies in said one direction through the respective channels and limit means mounted on the chains for reversing the direction in which the reversible drive means advances the scraper assemblies when reaching the material unloading ends of the channels, each said reversible engaging means including elongated guide means through which said flexible drive means extends, a pair of pawl elements pivotally mounted by the guide means for driving engagement with one of the chains in opposite directions of movement, and pawl lifting means movably carried by the guide means for displacement between opposite positions alternatively holding one of the pair of pawl elements out of engagement with the endless chain, said guide means comprising an elongated channel member having upwardly extending side portions at opposite ends thereof for pivotally mounting the pawl elements above the chain, chain link aligning means mounted at opposite ends of the channel member below the pawl elements to operatively guide the chain for driving engagement by the pawl elements, and roller means mounted by the channel member intermediate the opposite ends thereof for supporting the pawl lifting means in one of the opposite positions thereof.

8. The combination of claim 7 wherein said pawl lifting means comprises an elongated rod, pawl engaging hooks secured to opposite ends of the rod, and a cam member secured to the rod intermediate the hooks for supporting engagement with the roller means on the channel member of the guide means.

9. In combination with a channel within which material is collected, a reciprocated drive chain and a material moving assembly driven by said chain for displacing said material toward an unloading end of the channel comprising a pair of runners slidably mounted in said channel, spacing means interconnecting the pair of runners in fixed spaced relation to each other, blade means pivotally mounted by the spacing means between the runners for engagement with material within the channel, stop means fixedly mounted on the runners for preventing pivotal movement of the blade means in one direction for displacing said material only toward the unloading end of the channel in response to advancement of the runners through the channel, elongated guide means through which said chain extends, a pair of pawl elements pivotally mounted by the guide means for driving engagement with the chain, pawl lifting means movably carried by the guide means for displacement between opposite positions alternatively holding one of the pair of pawl elements out of engagement with the chain, and limit means mounted on the chain and engageable with opposite ends of the pawl lifting means for displacing the lifting means between the opposite positions thereof.

10. The combination of claim 9 wherein said guide means comprises an elongated channel member having upwardly extending side portions at opposite ends thereof for pivotally mounting the pawl elements above the chain, chain link aligning means mounted at opposite ends of the channel member below the pawl elements to operatively guide the chain for driving engagement by the pawl elements, and roller means mounted by the channel member intermediate the opposite ends thereof for supporting the pawl lifting means in one of the opposite positions thereof.

References Cited by the Examiner
UNITED STATES PATENTS

| | | | |
|---|---|---|---|
| 2,752,029 | 6/1956 | Hammond | 198—224 X |
| 3,033,348 | 5/1962 | Andrew | 198—224 X |
| 3,100,043 | 8/1963 | Cordis | 198—224 |

EVON C. BLUNK, *Primary Examiner.*

E. A. SROKA, *Examiner.*